United States Patent
Sjöbom

Patent Number: 5,333,378
Date of Patent: Aug. 2, 1994

[54] METHOD FOR PULLING BEARINGS, A BEARING PULLER AND USE THEREOF

[76] Inventor: Börje Sjöbom, Bällstavägen 23, S-864 00 Matfors, Sweden

[21] Appl. No.: 930,502
[22] PCT Filed: Dec. 30, 1991
[86] PCT No.: PCT/SE91/00918
§ 371 Date: Sep. 28, 1992
§ 102(e) Date: Sep. 28, 1992
[87] PCT Pub. No.: WO92/11976
PCT Pub. Date: Jul. 23, 1992

[30] Foreign Application Priority Data

Jan. 2, 1991 [SE] Sweden .................. 9100004

[51] Int. Cl.$^5$ .................. B23P 15/00
[52] U.S. Cl. .................. 29/898.08; 29/259; 29/263; 29/898.062; 254/131
[58] Field of Search .................. 29/898,08, 898.062, 29/724, 725, 244, 252, 253, 259, 266, 263; 254/131; 269/58.2, 49

[56] References Cited

U.S. PATENT DOCUMENTS

| | | | |
|---|---|---|---|
| 1,504,650 | 8/1924 | Smith | 29/898.08 |
| 1,536,553 | 5/1925 | Anderson, Sr. | 29/898.08 |
| 1,581,483 | 4/1926 | Dahlquist | 29/898.08 |
| 2,352,739 | 7/1944 | Sauer | 29/263 |
| 2,821,777 | 2/1958 | Kuster | 29/259 |
| 3,551,988 | 1/1971 | Berbel et al. | 29/259 |
| 3,763,539 | 10/1973 | Dodd | 29/201 |
| 3,908,258 | 9/1975 | Barty | 29/252 |
| 4,380,326 | 4/1983 | Marzorati et al. | 254/131 |
| 4,471,517 | 9/1984 | Denmeade | 29/259 |
| 4,694,569 | 9/1987 | Colvell et al. | 29/724 |
| 4,724,608 | 2/1988 | Parrott | 29/724 |
| 4,984,345 | 1/1991 | Sawada et al. | 29/263 |
| 5,163,211 | 11/1992 | Rubiuc et al. | 29/259 |
| 5,165,169 | 11/1992 | Boyce | 29/263 |
| 5,203,063 | 4/1993 | Bonani et al. | 29/259 |
| 5,220,716 | 6/1993 | Lostra | 29/252 |

FOREIGN PATENT DOCUMENTS 1096300 12/1960 Fed. Rep. of Germany.
421018 3/1967 Fed. Rep. of Germany.

OTHER PUBLICATIONS

Abstract—*Sanitary Tech Wks* G67 43B/31 SU 629-055.

Primary Examiner—Irene Cuda
Attorney, Agent, or Firm—Zarley, McKee, Thomte, Voorhees, & Sease

[57] ABSTRACT

An apparatus for pulling roller bearings (6) from a retainer (2), in which the outer ring (7) of the bearing in question is clamped up, and a shaft received in the inner ring (8) of the bearing, comprises a device arranged to grip the bearing and be subjected to a pulling force in the direction of the shaft end (16) extending through the bearing for pulling the bearing from the retainer. The gripping device comprises at least one gripping means (13) arranged to be inserted from said shaft end into the bearing between said outer and inner ring in the space (17) between two rolling elements (9', 10') arranged consecutively in the circumferential direction of the rings. The gripping means has a projection (19) arranged to, after inserting the gripping means into said space, be moved substantially in the circumferential direction of the rings in behind one of said rolling elements (9') and upon pulling the gripping means transform the pulling force into a compressive force acting on the rear side (33) of the rolling element and by that on the bearing.

12 Claims, 4 Drawing Sheets

METHOD FOR PULLING BEARINGS, A BEARING PULLER AND USE THEREOF

BACKGROUND OF THE INVENTION

The present invention relates to an apparatus for pulling rolling bearings from a retainer, as well as a use of such an apparatus and a method for such bearing pulling.

By definition rolling bearings include ball bearings as well as roller bearings. The invention is particularly well suited for pulling roller bearings in general and spherical radial roller bearings in particular.

Rolling bearings may in some cases by retained by press fit in a retainer therefor. For example, the retainer may be an end of a drying cylinder in a paper-making machine. After longtime use, perhaps decades, there may be a need to change the bearing because of irregular running and noise caused by wear. The bearing in question often has its outer ring very firmly stuck in the retainer. It is desirable to change the bearing without having to remove the bearing retainer from the shaft extending therethrough, especially in the case of bearings used within industry where machine stoppages have to be made as short as possible so as to keep the costs thereof low.

Pulling apparatuses for rolling bearings are already known by the CH patent publication 421 018 and the European patent application 0087895. These apparatuses have gripping means which grip the outer ring of the bearing and the inner ring as well as the outer ring of the bearing, respectively, so as to pull the bearing away from a retainer therefor (see especially said European patent application). However, these apparatuses may only be used to pull ball bearings, and the gripping means thereof do not grip the bearing in such a way that they can pull bearings which have their outer rings very firmly stuck in a retainer.

For example, spherical radial roller bearings are used for drying cylinders in paper-making machines. Those bearings are firmly retained in ends or gables fixed on both sides of the cylinder in base plates. The known apparatuses mentioned above cannot pull such bearings from the retainer (the gables) with the shaft projecting through the gable and the bearing, at least where no acceptable grip may be obtained in any of the races of the bearing of this type. The conventional procedure used for changing such bearings has consisted of first removing the gable in question from the base plate and removing the gable from the cylinder by pulling it over the shaft end thereof and then pressing or striking the bearing out of the gable with a suitable tool. A new bearing is then pressed into the gable which is moved over the shaft and secured to the base plate again. This procedure is very time-consuming- It may lead to dismantling of the driving arrangement for the shaft- It also generates high maintenance cost and, probably more importantly, high direct labor costs because of the machine downtime.

SUMMARY OF THE INVENTION

The object of the present invention is to provide an apparatus and a method of more efficiently pulling of rolling bearings from a retainer when the outer ring of the bearing in question is stuck in the retainer, especially roller bearings with outer rings being very firmly stuck.

The apparatus has at least one gripping means arranged to be inserted into the bearings between the outer and the inner ring. More particularly, the gripping means is inserted into the space between two consecutive rolling elements in the circumferential direction of the rings. The gripping means has a projection which after the insertion can be moved substantially in the circumferential direction of the rings to rest in behind one of the rolling elements. Therefore, a pulling force may be applied on the rolling element to urge the bearing out of engagement with the retainer in which it is stuck. This makes it possible to pull bearings whose outer ring is stuck very firmly in a retainer, since a very good grip is obtained by the gripping means because it grips behind a rolling element which is integral to the bearing itself. The pulling of the rolling element causes it to pull, or more correctly—push, the inner and outer rings between which it is axially and radially held. Since the gripping means does not grip any of the rings directly, the apparatus may accordingly be used to pull bearings with races having no actual surface or edge to grip conventionally, such as roller bearings, especially spherical radial roller bearings.

Thanks to the way in which the gripping means is designed to grip, namely through the space between consecutive rolling elements and in behind one of the rolling elements, the gripping means may be used even when the bearing is intact with both race rings on place.

According to one embodiment of the invention the apparatus comprises an elongated gripping means having radial projection at one end and a support member attached to the gripping means for pressing into the space between two consecutive rolling elements of a rolling bearing. When the gripping means is inserted in the space and the projection is moved behind one rolling element, the support member fills the circumferential gap between the gripping means and rolling elements so as to hold the gripping means in bearing action against the rolling elements and the projection behind one of the rolling elements. Thus, the gripping means and projection thereof will not disengage with the rolling elements, because of the exertion of a compressive force thereon by the same.

According to another embodiment of the invention the device comprises a plurality of gripping means arranged to grip the bearing at points regularly distributed around the periphery of the bearing rollers and a support member arranged to cooperate with each gripping means.

DETAILED DESCRIPTION OF A PREFERRED EMBODIMENT OF THE INVENTION

Figure 1:
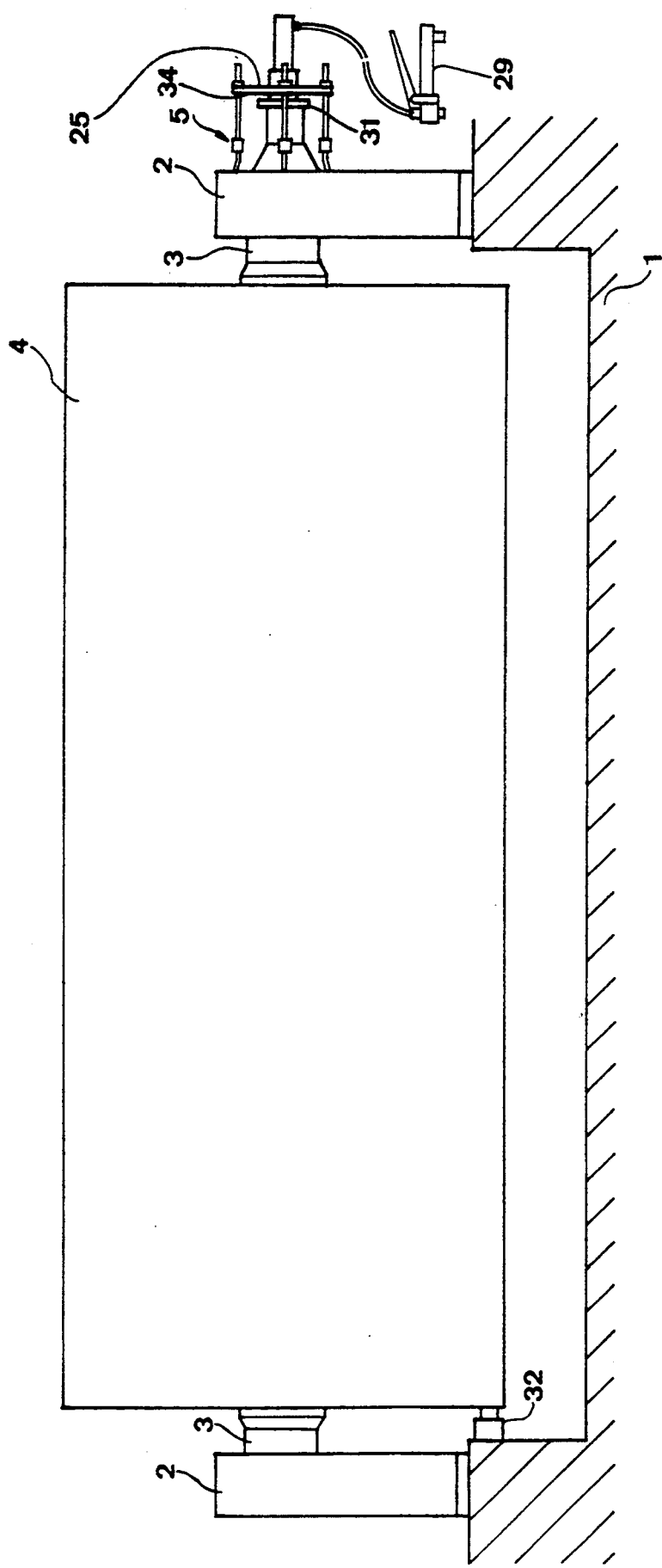
FIG. 1 is a schematic view illustrating a possible use of an apparatus according to the invention.

In a non-limiting fashion, a preferred embodiment of the apparatus according to the invention will be described hereafter by way of an example which is illustrated in FIG. 1. Here, the apparatus is shown as it is used in connection with pulling a spherical radial roller bearing from a retainer 2 fixed to the base plate 1 for mounting the shaft 3 of a drying cylinder 4 of a papermaking machine. The apparatus 5 is applied at one of the retainers 2 for removing the bearing retained therein. Shaft 3 at the opposite end of the drying cylinder 4 has a similar bearing and retainer arrangement.

Figure 2:
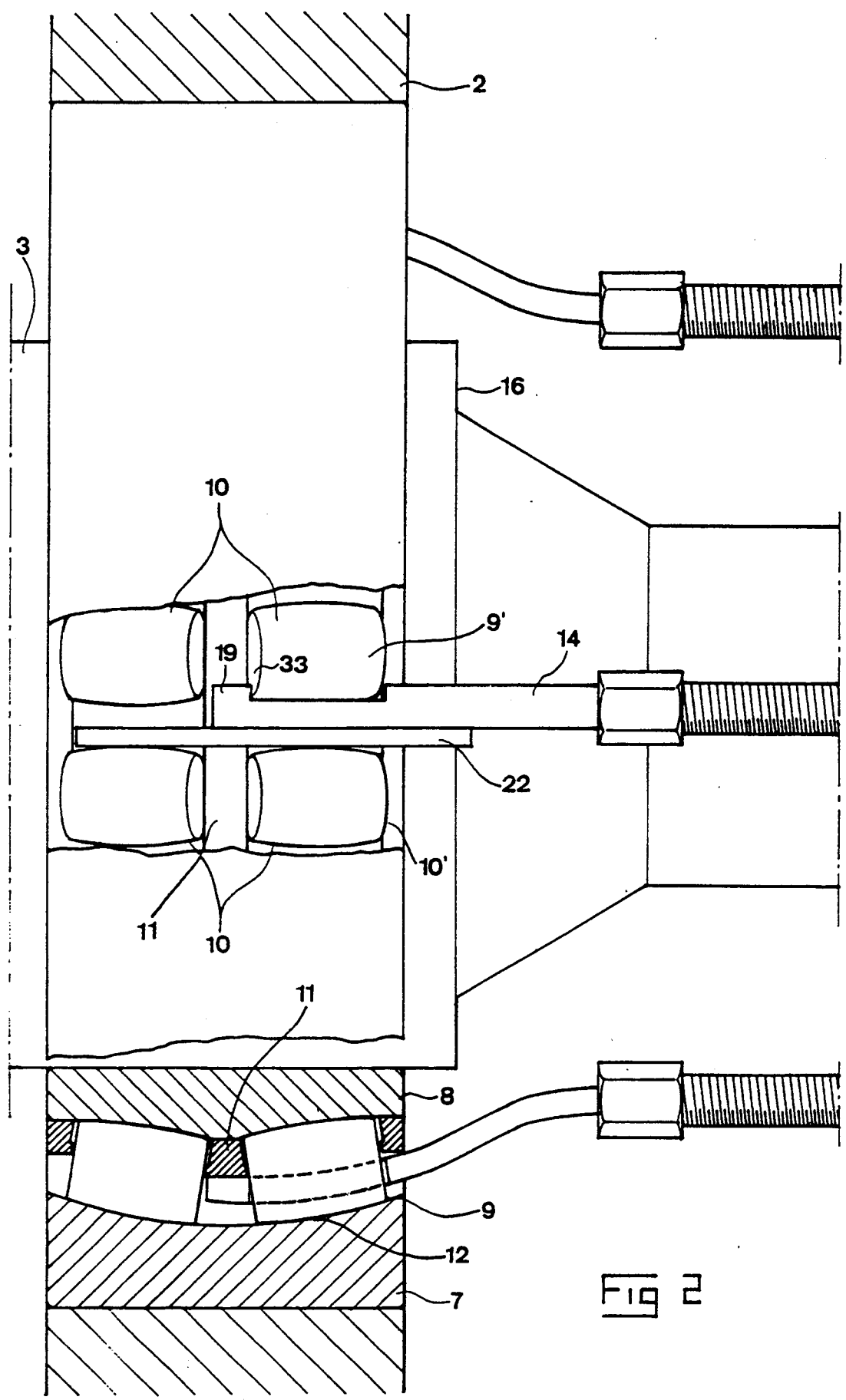
FIG. 2 is an enlarged and partly sectioned view taken along line 2—2 of a part of the apparatus shown in FIG. 1. A spherical radial roller bearing having a part of the outer race ring of the bearing broken away illustrates the application of the gripping means of this invention between the inner and outer ring.
Figure 5:
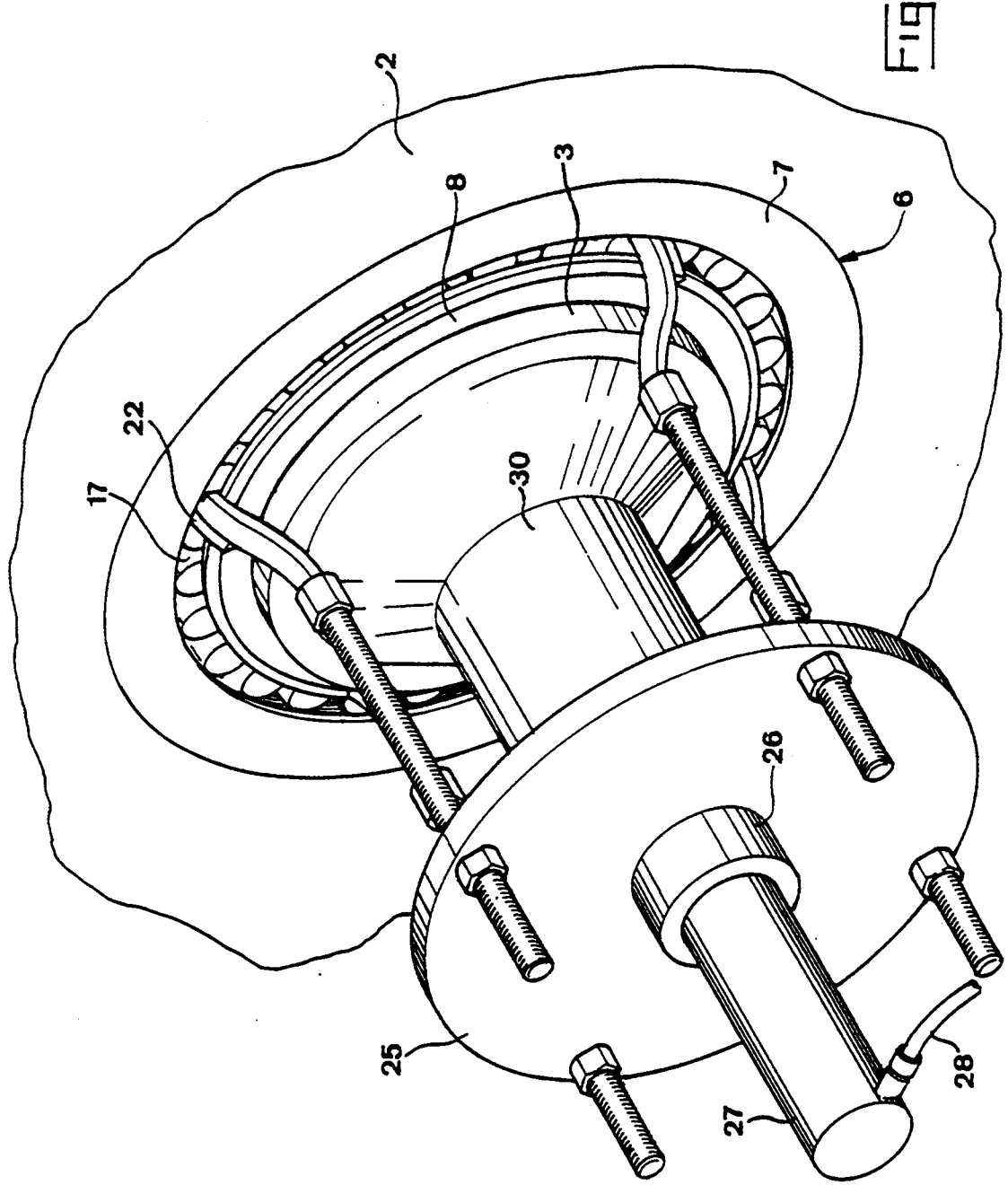
FIG. 5 is a perspective view illustrating a part of the apparatus according to FIG. 1 in an operational position for pulling a spherical radial roller bearing from a retainer therefor.

As shown in FIG. 5, the bearing 6 consists of an outer race ring 7, an inner race ring 8 movably arranged with respect thereto as well as a plurality of rollers 9 rotatably arranged between the rings. FIG. 2 shows that the rollers are held in pairs 10 of rollers arranged substantially behind each other when viewed from the axial direction of the bearing by roller carriers guided along a flange 11 of the inner ring 8. The roller carriers hold two roller pairs, which are arranged consecutively in the circumferential direction, a substantially constant distance apart. On the inner side, the rollers roll on the curved surfaces on the inner ring 8 and, on the outer side, on the spherical roller way 12 of the outer race ring 7. A bearing of this type has a very high radial and axial load capacity. The outer ring 7 is pressed into an interference fit with the receiving bore of the retainer 2 and may be very firmly stuck therein. The inner ring 8 may rotate with respect to the outer one while the rollers 9 are running on the spherical roller way or path 12. The inner ring may be fixed to the shaft 3 by a clamping sleeve. The clamping sleeve, if present, is loosened before the pulling operation, so that the inner ring is free of the shaft at the moment of the pulling of the bearing.

Figure 3:
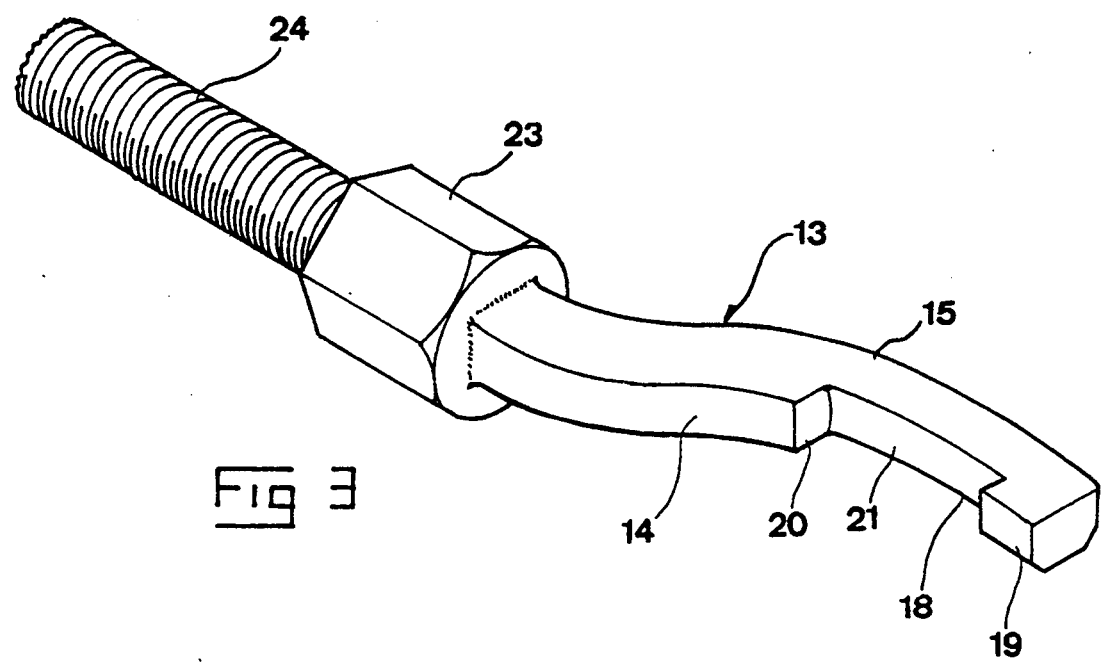
FIG. 3 is a perspective view of the gripping means of the present invention included in the apparatus according to FIG. 1.

As best seen in FIG. 3, the bearing pulling apparatus according to the invention has gripping means 13 in the form of a gripping arm 14. The outer portion 15 of arm 14 is adapted for insertion into the space between two consecutive rollers of the bearing. Portion 15 has a radially arced shape, directed substantially radially, and designed to allow the arm 14 to reach in behind a roller without hitting and being stopped by any of the rings or roller carriers of the bearing. The arc shaped outer portion 15 of the gripping arm 14 substantially corresponds to the arc shape of the spherical roller way 12 of the bearing (see dashed lines at the bottom of FIG. 2). The gripping arm 14 is adapted to be pushed inwardly in a substantially axial direction from the shaft end 16 of the bearing into the bearing. The gripping arm 14 is easily pushed between the outer and inner ring into the space 17 (see FIG. 5 also) between two rollers 9 arranged consecutively in the circumferential direction of the rings. Referring to FIG. 3, the gripping arm 14 has a recess 18 which is adapted to bear against a roller 9' as shown in FIG. 2 (in the pulling direction). From FIGS. 2, 3 and 5, it can be understood that projection 19, front wall 20, and bottom wall 21 envelop the surface of roller 9' that is directed toward the space 17.

Figure 4:
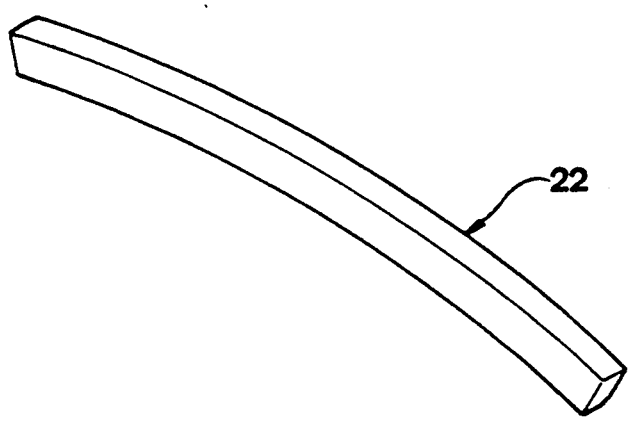
FIG. 4 is a perspective view of a support member adapted for cooperation with the gripping means shown in FIG. 3.

It is intended that the gripping arm 14 shall be inserted into space 17 in a substantially axial direction into a position in which the projection 19 is located further rearwardly than the closest rolling element and in the circumferential direction of the rings laterally with respect to the closest rolling element. The projection 19 is brought behind the rolling element by moving the arm 14 transversally to the extension thereof substantially in the circumferential direction of the rings towards the rolling element 9 into the position shown in the cut away section at the bottom of FIG. 2. The apparatus also comprises a support member 22 or support wedge (see FIG. 4), which has a radially directed arc shape substantially corresponding to the arc shape of the gripping arm, but which when the support member 22 is inserted into the bearing extends substantially through the entire bearing in the axial direction. The support member 22 is adapted to be wedged in between the gripping means while it is in the gripping position (see FIG. 2) and the next (axially consecutively) pair of rollers adjacent to the roller 9' gripped by the arm 14. The support member 22 preferably has a width in the circumferential direction of the rings which is slightly larger than the remaining space between the gripping arms 14 and the other rolling element 10' in the pulling position of the gripping means. This means that the support member 22 has to be forcibly driven into the space between the gripping arm 14 and the rollers of the roller pair 10, so that it functions as a wedge, thereby pressing these rollers and the gripping arm slightly apart so as to preload them with tension therebetween against leaving their positions. Due to the fact that the support member 22 bears against both members of the pair of axially consecutive rollers 10, a very stable support for holding the gripping arm 14 in place is obtained. FIG. 3 shows that the gripping means 13 has lateral chamferings so as not to interfere with the roller carrier when inserted in place. The support member 22 has similar chamfering along the longitudinal edge directed towards the inner race ring and away from the gripping means. The support member 22 is chamfered for the same reason the gripping means 13 is. The chamferings make it possible to increase the radial thickness of the gripping means and the support member in the pulling position thereof, without interfering with the roller carriers.

Referring to FIG. 2, it is possible to pull the bearing from the retainer 2 and the shaft 3 by applying a pulling or tractive force on the gripping arm 14, which is transformed through the projection 19 into a compressive force in the direction of the shaft end 16 acting on the rear side 33 of the roller 9' gripped thereby. Due to the fact that the gripping arm 14 bears against and gets support from the roller behind (at 19) and in front (at 20) thereof, along the enveloping surface 18 thereof and from the support member 22 or wedge pressing the gripping means in place, it is possible to transmit large forces through the projection 19 without causing it to slide out of its engagement with the roller 9'. How these forces are provided will be described furtheron.

A high nut 23 is fixed to the end of the gripping arm 14 opposite of the projection 19. A threaded axle pin 24 may be screwed into this nut, so that the gripping arm may be connected and secured to a carrier 25, shown in FIG. 5 as a circular plate. A plurality of axle pins 24 are evenly distributed along the carrier 25 and secured thereto. Each axle pin 24 is connected to a gripping arm 14, like the one shown in FIG. 3. This allows the gripping means to be inserted into evenly distributed spaces 17 around the circumference of the bearing. In this way a uniform pulling load is generated on the bearing by the pulling apparatus. This reduces the possibility of seizures. Since the gripping means are detachably secured to the respective axle pins they are easily interchangeable. It is possible to select between gripping arms of different dimensions and arc shape depending on the size of the bearings to be pulled off. Support members with dimensions and arc shapes suitable to each bearing are, of course, also provided.

Axle pins 24 are adjustably attached to the carrier 22 by nuts so as to make the position of the carrier with respect to the bearing adjustable to cover every situation. The carrier 25 has a sleeve 26 which is substantially axially directed with respect to the shaft 3 in the operation position thereof. A power means in the form of a hydraulic cylinder 27 is adapted to be attached to the shaft 3. The hydraulic cylinder is fluidly, through a fluid conduit 28, connected to a hydraulic pump 29 schematically indicated in FIG. 1. A shaft bit 30 extends axially from the shaft 3 and is secured thereto by conventional means. The shaft bit 30 has an inner channel for vapor and condensate, that is closed by means of a support plate 31 (see FIG. 1). A member 34 displaceable by means of the piston of the hydraulic cylinder 27 in the direction towards the shaft 3 is arranged to bear against the support plate 25. Finally, an abutment 32 in the form of a short hydraulic cylinder is arranged at the opposite end of the drying cylinder 4 between the base plate 1 and the drying cylinder 4, so as to make displacement in the direction of the gable 2 located to the left in FIG. 1 of the drying cylinder 4 and the shaft 3 impossible.

The method of using the apparatus described above is as follows. When pulling a bearing, the gripping arms 14 are firstly inserted into spaces 17 and hooked behind the rollers. The support members 22 are thereafter struck in so as to hold the respective gripping arm 14. The gripping arms 14 are then connected to the carrier 25 through the axle pins 24 and the support plate 31 is applied on the shaft bit 30. Then the pulling of the bearing may commence. The hydraulic pump 29 is actuated to deliver compressed fluid to the hydraulic cylinder 27 (FIG. 5), the piston of which is pressed towards the carrier 25 and presses member 34 against the support plate 31. In this way the support plate 31 is used as an abutment for pressing the carrier 25 in the axial direction away from the shaft bit 30, the shaft 3 and the retainer 2. This results in a pulling force in every gripping arm, which is transformed into a compressive force applied through each projection on the rear side of the respective roller. This tends to press the roller and, thus, the bearing out of the retainer. Thus, the bearing will be pulled out of the retainer by the urging of the carrier 25 away from the shaft bit 30.

Of course, it would also be possible to arrange a power means to act between a carrier and the retainer itself, instead of the carrier and the shaft, as shown here. Of course the retainer must withstand the necessary forces and avoid harmful uneven loads. Any type of carrying or lifting means can be arranged to hold the shaft 3 and the drying roll 4 against gravity when pulling the bearing and until the new bearing is put into place.

Of course it is also possible that the gripping arms could be preassembled on the axle pins. Then, when inserting the gripping arms into the spaces between the outer and inner ring, the entire apparatus, including the carrier 25 is turned to bring the projections behind the respective roller. However, the application of the support members would probably be a little bit more complicated in such a case.

For example, by utilizing the apparatus according to this invention, rolling bearings for shafts of 600 mm diameter may rapidly and efficiently be removed from the retainer and a new bearing installed. Long stops are avoided of operations, since the retainer 2 remains firmly mounted to the base plate 1 during the entire pulling operation.

Of course, the invention is not restricted solely to the embodiment described above. Several possibilities of modifications thereof would be apparent to one skilled in the art without departing from the basic idea of the invention.

Although the invention is particularly suited for pulling spherical roller bearings, it may advantageously be utilized for pulling other types of rolling bearings, primarily roller bearings.

Of course it would be possible to design the gripping arm in a different way. For example, the recess could be eliminated and a projection extended substantially perpendicularly from the arm at the end thereof, with another projection closer to the center thereof for receiving support from a front side of a roller.

The power means can be of any suitable type. For example, an electrically driven screw. It would even be possible to apply power in the form of an axle threadedly received in the carrier and able to be manually screwed through the carrier and pull the bearing there out of. This would be particularly useful when smaller bearings are to be pulled.

The support member could conceivably be shorter and only bear against one rolling element.

The projection of the gripping means could have another design than shown in order to adapt to the shape of the rolling element which is intended to be gripped, gripping and power transmission to the rolling element caused thereby may, of course, take place at a slight incline with respect to the shaft holding the bearing.

A series of other possible modifications would be completely apparent to a man skilled in the art. Therefore, it is not necessary to list them all here.

I claim:

1. A method for pulling roller bearings having a plurality of circumferentially spaced rolling elements disposed around a shaft and between an inner ring and an outer ring which is firmly stuck in a retainer, comprising:
   inserting a gripping device having a gripping means with a circumferentially directed projection into a space between first and second circumferentially consecutive rolling elements of the bearing and generally parallel to the axis of the shaft;
   moving said projection circumferentially behind said first rolling element to pullingly engage a rear side thereof;
   pressing a wedgable support member into said space between said gripping means and said second rolling element so that said support comes to bear substantially in the circumferential direction of the rings against said second rolling element as well as said gripping means and by abutment on said second rolling element holds said gripping means to bear against and with said projection behind said first rolling element, so that said projection cannot leave the bearing action thereof against said rear side of said first rolling element on application of said compressive force thereon; and
   applying a pulling force on said gripping means directed away from said retainer and generally parallel to said shaft, so that this pulling force is transformed through said gripping means into a compressive force acting on said rear side of the rolling element and consequently on the bearing so that the bearing is removed from said retainer.

2. An apparatus for pulling rolling bearings having a plurality of circumferentially spaced rolling elements disposed around a shaft and between an inner ring and an outer ring from a retainer in which said outer ring is firmly stuck, said apparatus comprising:

a device arranged to grip the bearing and be subjected to a pulling force directed away from the retainer and generally parallel to the shaft for pulling the bearing from the retainer, said gripping device comprising at least one gripping means arranged to be inserted into the bearing and generally parallel to the axis of the shaft;

wherein said gripping means is insertable between said outer and inner ring in a space between first and second rolling elements arranged consecutively in the circumferential direct of said rings;

said gripping means having a projection thereon, disposed to be moved substantially int he circumferential direction of said rings to a position at least partly behind said first rolling element such that, when said gripping means is pulled, the pulling force is transformed into a compressive force acting on a rear side of said first rolling element and consequently on the bearing;

said apparatus further comprising at least one wedgable support member arranged to be pressed into said space between said gripping means and said second rolling element, occupying said space together with said first rolling element when the gripping means is inserted in said space and said projection is brought behind said first rolling element; and said support member being adapted to bear substantially in the circumferential direction of the rings against said second rolling element as well as said gripping means and by abutment on said second rolling element hold said gripping means to bear against and by said projection behind said first rolling element, so that the projection cannot leave the bearing action thereof against said rear side of said first rolling element upon application of said compressive force.

3. An apparatus according to claim 2, characterized in that said gripping arm (14) in the pulling position thereof is adapted to bear against and conform to the front and both forward and rear profiles of said first rolling element (9') as viewed in an outwardly radial direction from said space (17).

4. An apparatus according to claim 2, characterized in that it is adapted for pulling roller bearings having rollers as rolling elements.

5. An apparatus according to claim 4, characterized in that it is adapted for pulling spherical radial roller bearings, said spherical roller bearings comprising a pair of adjacent forward and rearward rollers spaced apart axially along the shaft, and that said projection (19) is arranged to be moved to a position behind said forward roller and transmit said compressive force thereto.

6. An apparatus according to claim 5, characterized in that a portion (15) of said arm (14) which is adapted to be inserted into said space (17) has an arc shape directed substantially radially which allows said arm to reach behind said roller (9') without hitting and be stopped by any of said rings (7, 8) and any roller carriers present in the bearing.

7. An apparatus according to claim 5, characterized in that the support member (22) when it is inserted into said space (17), is designed to bear against both said forward and rearward rollers of a pair (10) of rollers being arranged axially beside each other and movable along a spherical surface of said outer ring and in the opposite direction against said gripping arm, and that said support member (22) has an arc shape directed substantially radially and is adapted to allow said support member to extend substantially axially substantially through the bearing.

8. An apparatus according to claim 7, characterized in that the width of said support member substantially in the circumferential direction of the rings is slightly larger than the remaining space between said gripping means (13) and second rolling element (10) in the pulling position of said gripping means, and that said support member (22) is arranged to function as a wedge by being inserted into said space (17) to press said second rolling element and said gripping means apart so the latter is forcibly prevented from leaving its inserted position.

9. An apparatus according to claim 2, characterized in that the arm (14) has a recess (18) the delimiting walls of which bear against forward, rear, and front sides of said first roller (9') as seen from said space (17) and form said projection (19) by a delimiting wall thereof belonging thereto and bearing against said rear side of the roller.

10. An apparatus according to claim 2, characterized in that said gripping device comprises a carrier (25) to which a plurality of said gripping means (13) are attached, and that said carrier is arranged to hold said gripping means inserted into a plurality of said spaces (17) substantially regularly distributed over the circumference of the bearing.

11. An apparatus according to claim 10, characterized in that said apparatus comprises a power means (27) arranged to act between said carrier (25) and said bearing retainer (2) and the shaft so as to remove said carrier (25) and the bearing (6) held thereto by said gripping means from said bearing retainer (2).

12. An apparatus according to claim 11, characterized in that said power means (27) is fixed tot he carrier (25) and arranged to press an extendible member (34) in axial direction against an end (16) of said shaft so as to use the latter as an abutment when pressing said carrier (25) in the axial direction away from the bearing retainer (2).

* * * * *